(12) United States Patent
Ki et al.

(10) Patent No.: US 11,625,334 B2
(45) Date of Patent: Apr. 11, 2023

(54) BOOTABLE KEY VALUE SOLID STATE DRIVE (KV-SSD) DEVICE WITH HOST INTERFACE LAYER ARRANGED TO RECEIVED AND RETURNS BOOT REQUESTS FROM HOST PROCESSOR USING STORAGE FOR OBJECTS

(71) Applicant: Samsung Electronics Co., Ltd., Suwon-si (KR)

(72) Inventors: Yang Seok Ki, Palo Alto, CA (US); Ilgu Hong, Santa Clara, CA (US)

(73) Assignee: SAMSUNG ELECTRONICS CO., LTD.

( * ) Notice: Subject to any disclaimer, the term of this patent is extended or adjusted under 35 U.S.C. 154(b) by 210 days.

(21) Appl. No.: 16/846,261

(22) Filed: Apr. 10, 2020

(65) Prior Publication Data

US 2021/0182400 A1 Jun. 17, 2021

Related U.S. Application Data

(60) Provisional application No. 62/948,797, filed on Dec. 16, 2019, provisional application No. 62/948,801, filed on Dec. 16, 2019.

(51) Int. Cl.
*G06F 12/00* (2006.01)
*G06F 12/1072* (2016.01)
(Continued)

(52) U.S. Cl.
CPC .......... *G06F 12/1072* (2013.01); *G06F 3/064* (2013.01); *G06F 3/0604* (2013.01); *G06F 3/0659* (2013.01); *G06F 3/0673* (2013.01); *G06F 3/0679* (2013.01); *G06F 9/4411* (2013.01); *G06F 12/0246* (2013.01);
(Continued)

(58) Field of Classification Search
CPC ............... G06F 12/1072; G06F 3/0604; G06F 3/0659; G06F 3/0673; G06F 3/0679; G06F 9/4411; G06F 12/0246; G06F 12/1466; G06F 21/575; H04L 9/0861; H04L 9/0894
See application file for complete search history.

(56) References Cited

U.S. PATENT DOCUMENTS 7,159,073 B2 1/2007 Longo et al.
7,779,273 B2 8/2010 Dale et al.
(Continued)

FOREIGN PATENT DOCUMENTS

AU 2019100055 A4 * 2/2019

OTHER PUBLICATIONS

Notice of Allowability for U.S. Appl. No. 16/824,689, dated Feb. 28, 2022.
(Continued)

*Primary Examiner* — Tammara R Peyton
(74) *Attorney, Agent, or Firm* — Renaissance IP Law Group LLP

(57) ABSTRACT

A Key-Value (KV) storage device is disclosed. The KV storage device may include storage for objects, each object including data associated with a key. A host interface layer may receive requests to read data associated with a key from the storage, to write data associated with a key to the storage, and a boot request to get boot data from the storage. A boot request processor may process the boot request using the storage.

17 Claims, 7 Drawing Sheets

(51) Int. Cl.
  *G06F 12/02* (2006.01)
  *G06F 12/14* (2006.01)
  *H04L 9/08* (2006.01)
  *G06F 3/06* (2006.01)
  *G06F 9/4401* (2018.01)
  *G06F 21/57* (2013.01)

(52) U.S. Cl.
  CPC ........ *G06F 12/1466* (2013.01); *G06F 21/575* (2013.01); *H04L 9/0861* (2013.01); *H04L 9/0894* (2013.01); *G06F 2212/7201* (2013.01); *G06F 2212/7207* (2013.01); *G06F 2221/034* (2013.01)

(56) References Cited

U.S. PATENT DOCUMENTS

| | | | |
|---|---|---|---|
| 8,046,574 | B2 | 10/2011 | Dale et al. |
| 9,075,710 | B2 | 7/2015 | Talagala et al. |
| 9,270,445 | B2 | 2/2016 | Lee et al. |
| 9,361,408 | B2 | 6/2016 | Marukame et al. |
| 9,519,575 | B2 | 12/2016 | Ramsundar et al. |
| 9,531,541 | B2 | 12/2016 | Beame |
| 9,542,199 | B2 | 1/2017 | Heo et al. |
| 10,083,118 | B2 | 9/2018 | Jeong et al. |
| 10,289,421 | B2 | 5/2019 | Jang et al. |
| 10,620,866 | B1 | 4/2020 | Kumar et al. |
| 10,956,346 | B1 | 3/2021 | Ben-Yehuda et al. |
| 2013/0103729 | A1 | 4/2013 | Cooney et al. |
| 2013/0111187 | A1* | 5/2013 | Liu .................. G06F 3/067 711/216 |
| 2013/0275656 | A1 | 10/2013 | Talagala et al. |
| 2015/0160862 | A1 | 6/2015 | Blott et al. |
| 2015/0379009 | A1 | 12/2015 | Reddy et al. |
| 2016/0246802 | A1 | 8/2016 | Regni et al. |
| 2016/0366226 | A1 | 12/2016 | Friedman et al. |
| 2018/0157419 | A1 | 6/2018 | Ki |
| 2019/0012085 | A1 | 1/2019 | Schreter |
| 2019/0384492 | A1 | 12/2019 | Ki |
| 2021/0182400 | A1 | 6/2021 | Ki et al. |

OTHER PUBLICATIONS

Knight, Fred, "SBC-3 Thin Provisioning Commands," Nov. 2008, T10, 08-149r4, 25 pages.
Lee, Eunji et al., "How to Teach an Old File System Dog New Object Store Tricks," Jul. 2018, USENIX, HotStorage 18, 6 pages.
Notice of Allowance for U.S. Appl. No. 16/824,689, dated Jan. 5, 2022.
Office Action for U.S. Appl. No. 16/824,689, dated Sep. 3, 2021.

* cited by examiner

| | |
|---|---|
| LBA 0 | Protective MBR |
| LBA 1 | Primary GPT Header |
| LBA 2 | Entry 1 / Entry 2 / Entry 3 / Entry 4 |
| LBA 3 | Entries 5-128... |
| LBA 34 | Partition 1 |
| | Partition 2 |
| | Remaining Partitions... |
| LBA -34 | Entry 1 / Entry 2 / Entry 3 / Entry 4 |
| LBA 0-33 | Entries 5-128... |
| LBA -2 | Secondary GPT Header |

FIG. 4

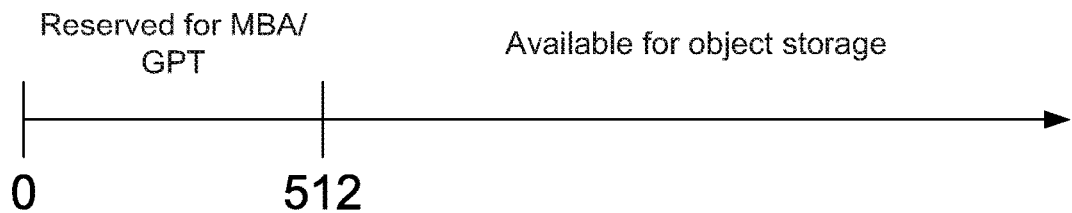
FIG. 5A
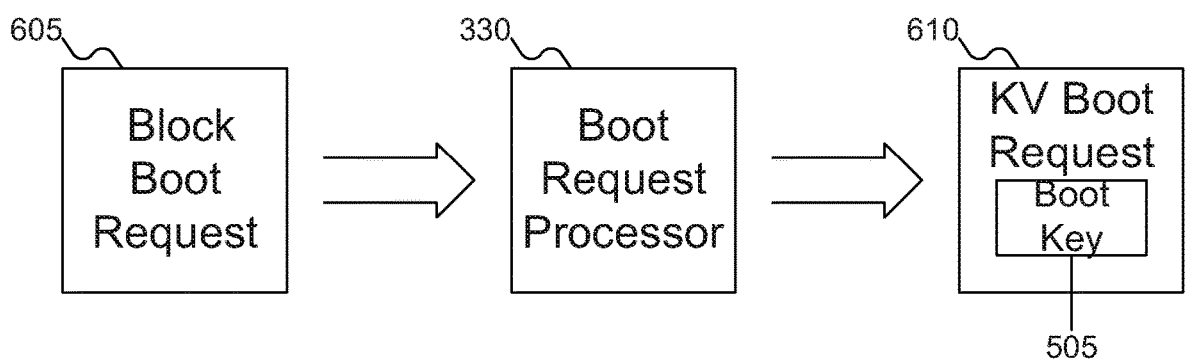
FIG. 5B
FIG. 6

BOOTABLE KEY VALUE SOLID STATE DRIVE (KV-SSD) DEVICE WITH HOST INTERFACE LAYER ARRANGED TO RECEIVED AND RETURNS BOOT REQUESTS FROM HOST PROCESSOR USING STORAGE FOR OBJECTS

RELATED APPLICATION DATA

This application claims the benefit of U.S. Provisional Patent Application Ser. No. 62/948,797, filed Dec. 16, 2019 and U.S. Provisional Patent Application Ser. No. 62/948,801, filed Dec. 16, 2019, both of which are incorporated by reference herein for all purposes.

This application is related to U.S. patent application Ser. No. 16/824,689, filed Mar. 19, 2020, which claims the benefit of U.S. Provisional Patent Application Ser. No. 62/948,797, filed Dec. 16, 2019 and U.S. Provisional Patent Application Ser. No. 62/948,801, filed Dec. 16, 2019, all of which are incorporated by reference herein for all purposes

FIELD

The inventive concepts relate generally to storage devices, and more particularly to bootable Key-Value (KV) storage devices.

BACKGROUND

Key-Value Solid State Drives (KV-SSDs) provide an alternative way to store and access data. Instead of providing a Logical Block Address (LBA) that the SSD maps to a Physical Block Address (PBA) on the device, a host assigns a key to the data. Provided the key is unique relative to other keys on the KV-SSD, any data may be stored on the KV-SSD. This leads to a reduced set of instructions for the KV-SSD: typically, little more is needed than commands to store a value associated with a key (PUT), retrieve a value associated with a key (GET), and delete the value associated with a key (DELETE) (the specific commands names may vary).

But currently KV-SSDs are not bootable. To be bootable, the system must be able to send a (block) command to access information stored in a particular location on the device. While hard disk drives and block interface SSDs permit such commands, KV-SSDs do not support such commands. Thus, in systems that use KV-SSDs, multiple storage devices are needed: the KV-SSD, and another device that is bootable (for the operating system).

A need remains for a way to permit KV devices to be bootable devices.

BRIEF DESCRIPTION OF THE DRAWINGS

FIG. 4 shows details of an example partition table scheme.

FIGS. 5A-5B show how the KV-SSD of FIG. 1 may store boot information, according to embodiments of the inventive concept.

FIG. 6 shows the boot request processor of FIG. 3 converting a block boot request into a Key-Value (KV) boot request.

DETAILED DESCRIPTION

Figure 1:
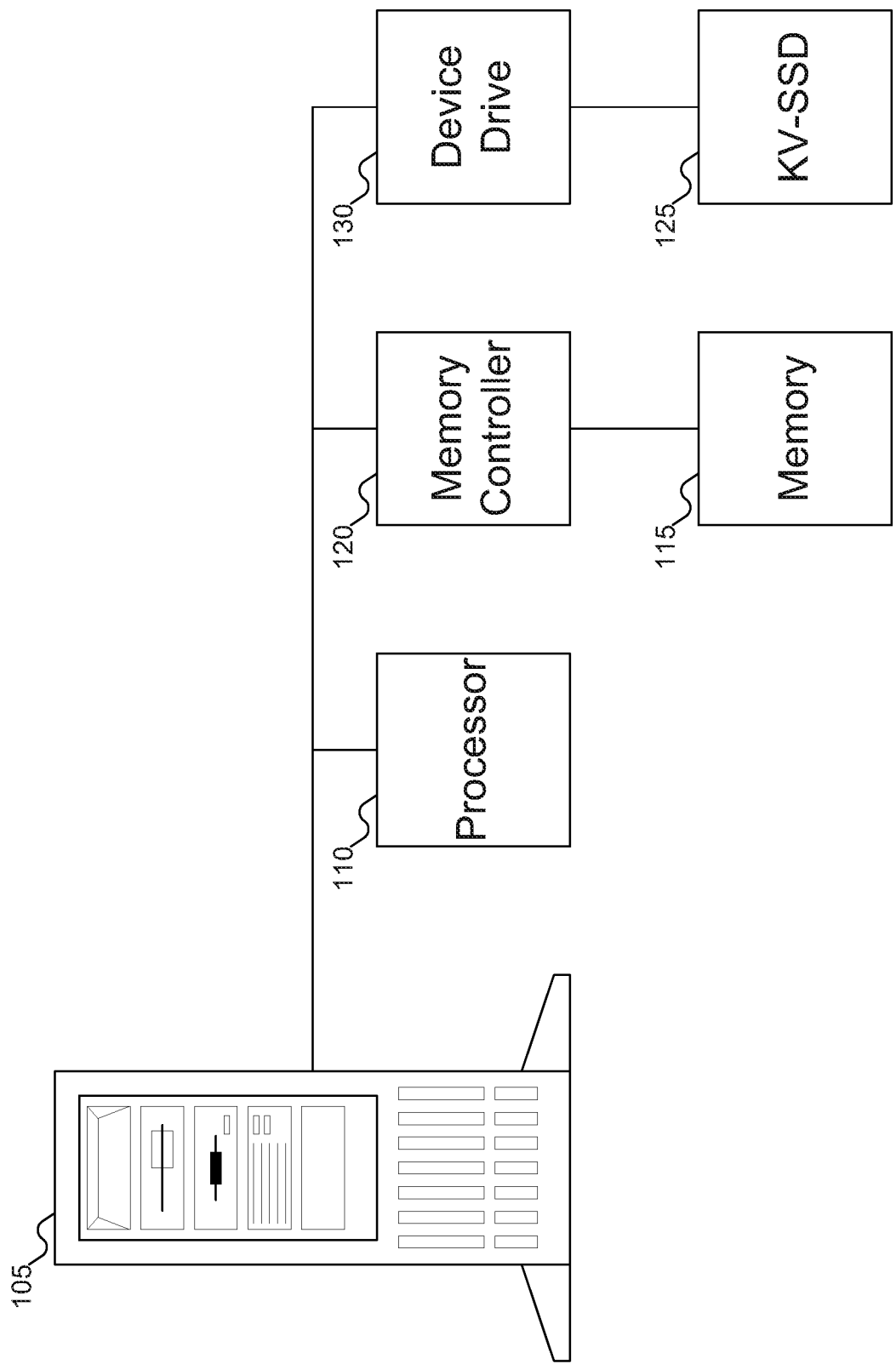
FIG. 1 shows a machine including a bootable Key-Value Solid State Drive (KV-SSD), according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

How block devices may be made bootable is well defined. Essentially, the device accesses a Logical Block Address (LBA) of 0. There is no corresponding definition for KV devices. But provided the KV device complies with either the Master Boot Record (MBR) or Unified Extensible Firmware Interface (UEFI) standard, it should be possible for a KV device to be bootable.

So, to make a KV device bootable, the KV device should be able to process a (block) command to read the information at LBA 0. This process may involve reading information that is stored at a reserved address (for example, physical address 0 on the device), or by storing boot information in an object with a special (reserved) key that may not be used by other users of the device.

If the KV device is designed to store information at a special address (such as LBA 0), then the device may be capable of processing a special (block) command, such as "read LBA 0" or its equivalent. If the KV device stores boot information in an object associated with a reserved key, this object may by stored anywhere on the device. Further, the KV device may either receive a (block) command to read LBA 0 (which may then be mapped directly to a GET command using the reserved key) or a GET command to read the data associated with the reserved key (assuming the computer is designed to send a KV command to the KV device to boot the KV device and load the operating system).

When MBR is used, the Partition ID is required for the KV-emulated partition, which uses 8 bits. When UEFI is used, a GUID (63C9EB50-B05B-11E8-B568-0800200C9A66) is required for the KV-emulated partition.

FIG. 1 shows a machine including a bootable Key-Value Solid State Drive (KV-SSD), according to an embodiment of the inventive concept. In FIG. 1, machine 105 is shown.

Machine 105 may include processor 110. Processor 110 may be any variety of processor: for example, an Intel Xeon, Celeron, Itanium, or Atom processor, an AMD Opteron processor, an ARM processor, etc. While FIG. 1 shows a single processor 110 in machine 105, machine 105 may include any number of processors, each of which may be single core or multi-core processors, and may be mixed in any desired combination.

Machine 105 may also include memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types. Machine 105 may also include memory controller 120, which may be used to manage access to memory 115.

Machine 105 may also include storage device 125, shown as a Key-Value Solid State Drive (KV-SSD). KV-SSD 125 uses a key-value interface to access data: an application or operating system may provide KV-SSD 125 with a key, which KV-SSD 125 may then map to a location on KV-SSD 125. KV-SSD 125 may then access and return the value stored at that location on KV-SSD 125. Unlike the complex command set offered by a conventional file system on conventional storage devices, KV-SSD 125 typically offers a fairly small set of commands, such as: GET (to retrieve the value associated with a provided key), PUT (to store the provided value on the KV-SSD, associated with either a provided key or with a KV-SSD generated key, which may be returned), and ERASE (to delete the value associated with the provided key from the KV-SSD, and remove the key-value association from the KV-SSD tables) (KV-SSD 125 may support other commands as well and may use different command names than those shown, but the principles are generally as described). KV-SSD 125 may also be replaced with any other storage device that supports object storage as described in the embodiments of the inventive concept below. Processor 110 may run device driver 130, which may support access to KV-SSD 125.

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines. In addition, the application that may be accessing data from KV-SSD 125 may located in another machine, separate from machine 105 and accessing machine 105 via a network connection traversing one or more networks of any types (wired, wireless, global, etc.).

Figure 2:
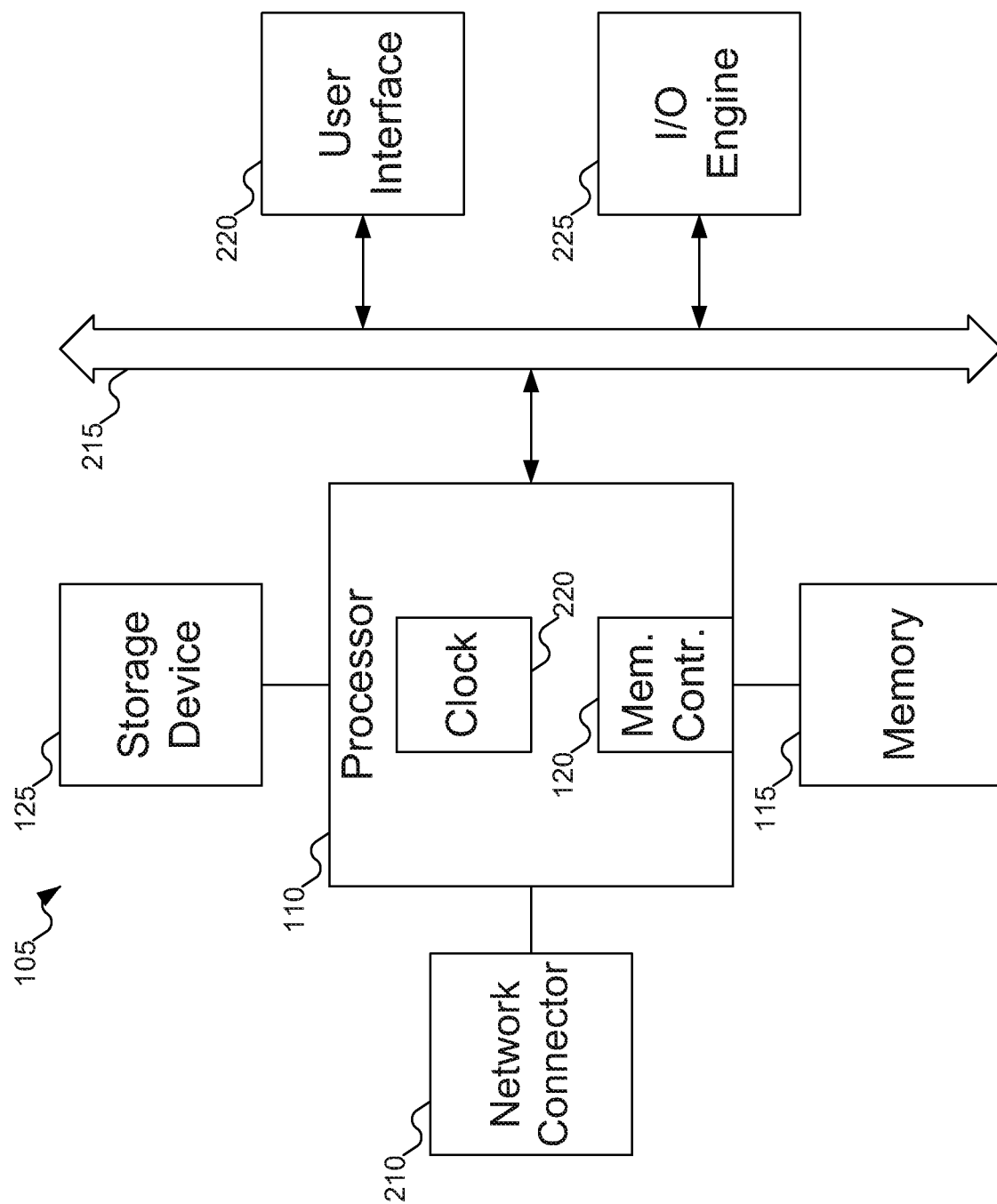
FIG. 2 shows additional details of the machine of FIG. 1.

FIG. 2 shows additional details of machine 105 of FIG. 1. In FIG. 2, typically, machine 105 includes one or more processors 110, which may include memory controllers 120 and clocks 205, which may be used to coordinate the operations of the components of device 105. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
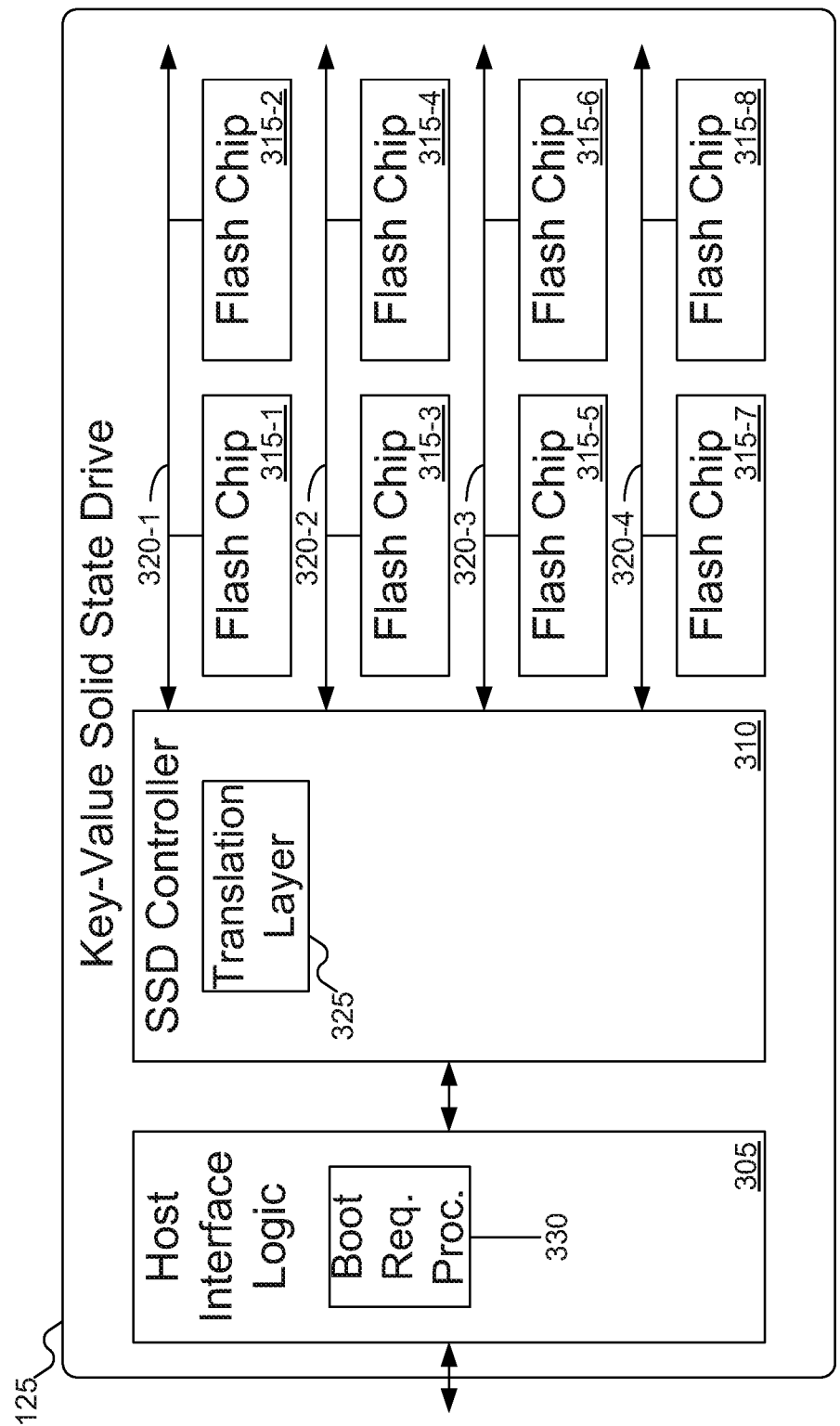
FIG. 3 shows details of the KV-SSD of FIG. 1.

FIG. 3 shows details of KV-SSD 125 of FIG. 1. In FIG. 3, KV-SSD 125 may include host interface logic (HIL) 305, SSD controller 310, and various flash memory chips 315-1 through 315-8 (also termed "flash memory storage"), which may be organized into various channels 320-1 through 320-4. Host interface logic 305 may manage communications between KV-SSD 125 and other components (such as processor 110 of FIG. 1). These communications may include read requests to read data from KV-SSD 125, write requests to write data to KV-SSD 125, and delete requests to delete data from KV-SSD 125. Host interface logic 305 may manage an interface across only a single port, or it may manage interfaces across multiple ports. Alternatively, KV-SSD 125 may include multiple ports, each of which may have a separate host interface logic 305 to manage interfaces across that port. Embodiments of the inventive concept may also mix the possibilities (for example, an SSD with three ports might have one host interface logic to manage one port and a second host interface logic to manage the other two ports).

SSD controller 310 may manage the read and write operations, along with garbage collection and other operations, on flash memory chips 315-1 through 315-8 using a flash memory controller (not shown in FIG. 3).

In a block-based storage device, particularly a block-based SSD, the host may assign a logical block address (LBA) to data, which a storage device may map to a physical block address (PB A). The storage device may maintain a record of these mappings, freeing the SSD and the host from having to ensure that the host is kept up-to-date on the current PBA of data. The host simply uses the LBA; the storage device maps the LBA to a PBA and returns the appropriate information. If data is moved internally to the storage device (as might happen during, for example, data overwrite or garbage collection on SSDs), such data movement is transparent to the host (with the mapping being updated with the new PBA of the data). Such structures that map LBAs to PBAs may be termed translation layers (or, particularly in the context of SSDs and other devices that use flash storage) flash translation layers.

KV-SSDs, in contrast, manage data differently. Rather than data being assigned an LBA, data (also called a value or data value) may be assigned a key (also called an object key). While this might seem to be nothing more than a terminology change ("object key" replacing "LBA"), there are other differences between keys and object LBAs (and between KV-SSDs and block-based SSDs). The size of a block in a block-based SSD is fixed at the time of manufacturer. For example, in a block-based SSD that has blocks of 4 KB, every block is 4 KB in size: there is no flexibility. This fact means that LBAs are also divided into 4 KB units to effectively map to the blocks on the SSD. KV-SSDs, on the other hand, permit flexible sizes for the data values. For example, value sizes might range from 0 B to 2 MB. In addition, object key sizes may also vary: for example, from 4 B to 255 B. These arrangements permits more flexibility in how data is stored than may be offered by a block-based SSD.

Thus, instead of a flash translation layer, KV-SSD 125 might include some sort of mapping from object key to address where the data value is stored, such as translation layer 325. Translation layer 325 may map from an object key to an address where the corresponding data is stored on KV-SSD 125. Translation layer 325 may also store additional data: for example, how large the object is (and therefore how the entire object may be stored on KV-SSD 125.

While FIG. 3 shows KV-SSD 125 as including eight flash memory chips 315-1 through 315-8 organized into four channels 320-1 through 320-4, embodiments of the inventive concept may support any number of flash memory chips organized into any number of channels. Similarly, while FIG. 3 shows the structure of a KV-SSD, other storage devices (for example, hard disk drives) may be implemented using a different structure, but with similar potential benefits, to include both security and data deduplication.

Host interface layer 305 may also include boot request processor 330. Boot request processor 330 may handle processing block-based boot requests from the BIOS of machine 105. Boot request processor 330 may be implemented using a general purpose processor with suitable software being executed by that processor, using a Field Programmable Gate Array (FPGA) or an Application-Specific Integrated Circuit (ASIC), or using a Graphics Processing Unit (GPU) or a General-Purpose GPU (GPGPU), among other possibilities. The specific operation of boot request processor 330 is discussed further with reference to FIGS. 5A-5B below. While FIG. 3 shows boot request processor 330 as part of host interface layer 305, embodiments of the inventive concept may place boot request processor 330 in other locations: for example, within SSD controller 310.

When a storage device is used as a boot device, the Basic Input/Output System (BIOS) of the computer may attempt to load certain information from the storage device. This information may be used to bootstrap the rest of the operating system. When a block-based device, such as a hard disk drive or a block-based SSD is used, the BIOS may send a request to read data from a particular Logical Block Address (LBA), such as LBA 0. The storage device knows how to locate the requested data and may return the appropriate information to the BIOS to start the execution of the operating system.

In general, there are two ways in which such information may be stored on a storage device. One way is to store a Master Boot Record (MBR). A MBR is typically stored in the first sector of the device, and occupies 512 bytes of storage. Two example formats of MBRs are shown below: Table 1 shows a modern standard MBR, whereas Table 2 shows a Disk Manager (DM) MBR.

TABLE 1

| Address | | Description | | Size (bytes) |
|---|---|---|---|---|
| Hex | Decimal | | | |
| +000h | +0 | Bootstrap code area (part 1) | | 218 |
| +0DAh | +218 | 0000h | Disk timestamp (optional, MS-DOS 7.1-8.0 and Windows 95B/998/98SE/ME. Alternatively, can serve as OEM loader signature with NEWLDR) | 2 |
| +0DCh | +220 | Original physical drive (80h-FFh) | | 1 |
| +0DDh | +221 | Seconds (0-59) | | 1 |
| +0DEh | +222 | Minutes (0-59) | | 1 |
| +0DFh | +223 | Hours (0-23) | | 1 |
| +0E0h | +224 | Bootstrap code area (part 2, code entry at 000h) | | 216 (or 222) |
| +1B8h | +440 | 32-bit disk signature | Disk signature (optional, UEFI, Windows NT/2000/Vista/7 and other OSes) | 4 |
| +1BCh | +444 | 0000h (5A5Ah if copy-protected) | | 2 |
| +1BEh | +446 | Partition entry No. 1 | Partition table (for primary partitions) | 16 |
| +1CEh | +462 | Partition entry No. 2 | | 16 |
| +1DEh | +478 | Partition entry No. 3 | | 16 |
| +1EEh | +494 | Partition entry No. 4 | | 16 |
| +1FEh | +510 | 55h | Boot signature | 2 |
| +1FFh | +511 | AAh | | |

TABLE 2

| Address | | Description | | Size (bytes) |
|---|---|---|---|---|
| Hex | Decimal | | | |
| +000h | +0 | Bootstrap code area | | 252 |
| +0FCh | +252 | AAh | DM Signature (optional) | 2 |
| +0FDh | +253 | 55h | | |
| +0FEh | +254 | Partition entry | DM Expanded Partition Table | 16 |
| +10Eh | +270 | Partition entry | | 16 |
| +11Eh | +286 | Partition entry | | 16 |
| +12Eh | +302 | Partition entry | | 16 |
| +13Eh | +318 | Partition entry | | 16 |
| +14Eh | +334 | Partition entry | | 16 |
| +15Eh | +350 | Partition entry | | 16 |
| +16Eh | +366 | Partition entry | | 16 |
| +17Eh | +382 | Partition entry | | 16 |
| +18Eh | +398 | Partition entry | | 16 |
| +19Eh | +414 | Partition entry | | 16 |
| +1AEh | +430 | Partition entry | | 16 |
| +1BEh | +446 | Partition entry No. 1 | Partition Table (for primary partitions) | 16 |
| +1CEh | +462 | Partition entry No. 2 | | 16 |
| +1DEh | +478 | Partition entry No. 3 | | 16 |
| +1EEh | +494 | Partition entry No. 4 | | 16 |
| +1FEh | +510 | 55h | Boot signature | 2 |
| +1FFh | +511 | AAh | | |

The alternative to an MBR is to use a Globally Unique Identifier (GUID) Partition Table (GPT). The GPT structure is beginning to replace MBR as the chosen structure for boot information; but as the BIOS in older machines may expect an MBR to be returned, storage devices may continue to support the use of MBR. Table 3 below shows an example GPT header format, and Table 4 below shows an example GUID partition entry format; FIG. 4 shows an example GUID partition table scheme.

TABLE 3

| Offset | | | |
|---|---|---|---|
| Hex | Decimal | Length | Contents |
| +00h | +0 | 8 bytes | Signature ("EFI PART", 45h 46h 49h 20h 50h 41h 52h 54h or 0x5452415020494645ULL (on little-endian machines) |
| +08h | +8 | 4 bytes | Revision (for GPT version 1.0 (through at least UEFI version 2.7 (May 2017)), the value is 00h 00h 01h 00h) |
| +0Ch | +12 | 4 bytes | Header size in little endian (in bytes, usually 5Ch 00h 00h 00h or 92 bytes) |
| +10h | +16 | 4 bytes | CRC32/zlib of header (offset +0 up to header size) in little endian, with this field zeroed during calculation |
| +14h | +20 | 4 bytes | Reserved, must be zero |
| +18h | +24 | 8 bytes | Current LBA (location of this header copy) |
| +20h | +32 | 8 bytes | Backup LBA (location of the other header copy) |
| +28h | +40 | 8 bytes | First usable LBA for partitions (primary partition table last LBA + 1) |
| +30h | +48 | 8 bytes | Last usable LBA (secondary partition table first LBA − 1) |
| +38h | +56 | 16 bytes | Disk GUID (also referred as UUID on UNIX machines) |
| +48h | +72 | 8 bytes | Starting LBA of array of partition entries (always 2 in primary copy) |
| +50h | +80 | 4 bytes | Number of partition entries in array |
| +43h | +84 | 4 bytes | Size of a single partition entry (usually 80h or 128) |
| +58h | +88 | 4 bytes | CRC32/zlib of partition array in little endian |
| +5Ch | +92 | * | Reserved, must be zero for the rest of the block (420 bytes for a sector size of 512 bytes, but may be more with larger sector sizes) |

TABLE 4

| Offset | | | |
|---|---|---|---|
| Hex | Decimal | Length | Contents |
| +00h | +0 | 16 bytes | Partition type GUID |
| +10h | +16 | 16 bytes | Unique partition GUID |
| +20h | +32 | 8 bytes | First LBA (little endian) |
| +28h | +40 | 8 bytes | Last LBA (inclusive, usually odd) |
| +30h | +48 | 8 bytes | Attribute flags (e.g., bit 60 denotes read-only) |
| +38h | +56 | 72 bytes | Partition name 36 UTF-16LE code units) |

As noted above, to access either an MBR or a GPT, the BIOS of the computer system typically sends a request to read a particular block, such as LBA 0, on the storage device. But Key-Value (KV) storage devices do not organize data the same way that block-based storage devices do, nor do they process block-based read requests. Nor is there a well-defined methodology for accessing boot information from a KV storage device. Thus, conventional KV storage devices may not be used as boot devices.

There are three solutions to the problem. One solution would be to establish a specific reserved key that may be used in a KV request from the BIOS to retrieve the boot data. But until such a standard is established, such a solution is not usable. In addition, while such a solution could be useful going forward, this solution would not work for an older BIOS that assumes the storage device may receive block-based requests (and that may not be updated to issue a KV request for boot data). Thus, this solution would not be backward compatible with existing computer systems and existing BIOS firmware.

A second solution is to enable KV-SSD 125 of FIG. 1 to receive and process a block-based boot request. Note that this solution is not necessarily advocating that KV-SSD 125 of FIG. 1 may process any block-based requests (although it may be possible to configure KV-SSD 125 of FIG. 1 to process block-based requests generally): instead, this solution includes configuring KV-SSD 125 of FIG. 1 only to handle the block-based request from the BIOS for the boot data. FIG. 5A shows how KV-SSD 125 of FIG. 1 may be arranged to store the boot data and how KV-SSD 125 of FIG. 1 may be configured to process such block-based boot requests.

A third solution is to configure KV-SSD 125 of FIG. 1 to receive a block-based boot request, map that block-based boot request to a KV request, which KV-SSD 125 of FIG. 1 may then process according to conventional techniques. FIG. 5B shows how KV-SSD 125 of FIG. 1 may be arranged to store the boot data and how KV-SSD 125 of FIG. 1 may be configured to process such block-based boot requests.

FIG. 5A shows embodiments of the inventive concept where KV-SSD 125 of FIG. 1 may be configured to read boot data directly from KV-SSD 125 of FIG. 1 directly in response to the block-based boot request. In FIG. 5A, the first portion of KV-SSD 125 of FIG. 1 may be reserved to store boot information, much like existing block-based storage devices. That is, the sector, block, or other segment of storage beginning at address 0 of KV-SSD 125 of FIG. 1 may be reserved to store the boot data (be it an MBR as described above with reference to Table 1 and Table 2, or a GPT as described above with reference to Table 3, Table 4, and FIG. 4). Then, when host interface layer 305 of FIG. 3 receives the block-based boot request from the BIOS of machine 105 of FIG. 1, boot request processor 330 of FIG. 3 may intercept that request (which SSD controller 310 of FIG. 3 might not be able to process anyway), access the boot data from the portion of KV-SSD 125 of FIG. 1 starting at address 0, and return that boot data to the BIOS of machine 105 of FIG. 1. Note that in such embodiments of the inventive concept, only the first portion of KV-SSD 125 of FIG. 3 is reserved for the MBR or GPT; all remaining addresses may be used to store objects as would a conventional KV-SSD. While FIG. 5A shows 512 bytes reserved for the boot data, embodiments of the inventive concept may reserve any amount of storage for the boot data: 512 bytes is merely an example amount of reserved storage.

FIG. 5B shows embodiments of the inventive concept where KV-SSD 125 of FIG. 1 may store the boot data in a reserved object. In FIG. 5B, translation layer 325 is shown. Translation layer 325 may include an entry for a reserved object key, shown as key 505. Object key 505 may map to address 510, where the boot data may be stored. Note that while object key 505 is labeled as "reserved", any key may be used as the object key for the boot data, as long as boot request processor 330 of FIG. 3 may know what the reserved object key is. For example, the reserved object key may be a GUID, or it may be a locally generated identifier. But whatever the reserved object key is, KV-SSD 125 of FIG. 1 should prevent ordinary applications from overwriting the boot data associated with the reserved key. Much like conventional block-based storage devices are designed to prevent applications from writing data to the section of the storage devices where the boot data is stored, KV-SSD 125 of FIG. 1 should prevent applications from writing to the reserved object key, lest the applications render KV-SSD 125 unbootable (although the operating system should be permitted to change the boot data associated with the reserved object key as appropriate for operating system updates).

Once the reserved object key is known, boot request processor 330 of FIG. 3 may intercept the block-based boot request from the BIOS and replace that request with a KV request to retrieve the boot data associated with the reserved object key. KV-SSD 125 of FIG. 1 may then process this request the same as any other KV request: mapping the (reserved) object key to an address using translation layer 325, accessing the boot data at that address, and returning the boot data to the BIOS of machine 105 of FIG. 1. In case there is a difference in the format of a response to a KV request and a block-based request, boot request processor 330 of FIG. 3 may also reformat the response as sent from SSD controller 310 of FIG. 3 into the format expected by the BIOS of machine 105 of FIG. 1 and send the reformatted response to the BIOS of machine 105 of FIG. 1.

FIG. 6 shows boot request processor 330 of FIG. 3 converting a block boot request into a Key-Value (KV) boot request. As discussed above with reference to FIG. 5B, some embodiments of the inventive concept may include boot request processor 330 intercepting the block-based boot request and replacing it with a KV request. Note that since block-based boot request 605 requests data at a particular address (LBA 0), boot request processor 330 need only look for block-based boot requests that meet this specific format, and may ignore all other messages from machine 105 of FIG. 1. Boot request processor 330 may then replace block-based boot request 605 with KV boot request 610, which may include reserved object key 505 (which may also be called a boot key). Again, as the reserved object key 505 is known in advance, the structure of KV boot request 610 is in a specific format: boot request processor 330 need not generate any other KV requests.

Figure 7:
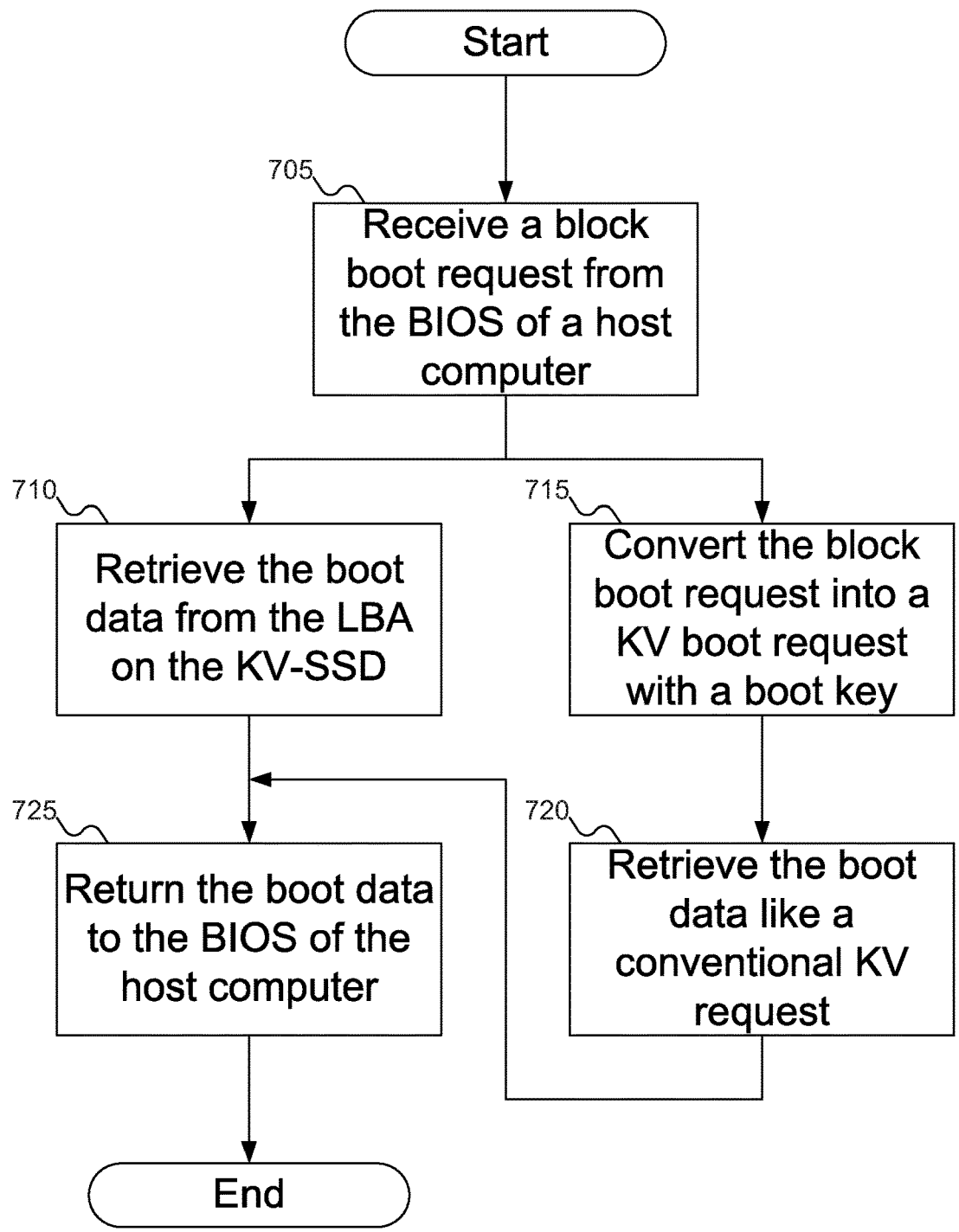
FIG. 7 shows a flowchart of an example procedure for the KV-SSD of FIG. 1 to process a block boot request, according to an embodiment of the inventive concept.

FIG. 7 shows a flowchart of an example procedure for KV-SSD 125 of FIG. 1 to process block boot request 605 of FIG. 6, according to an embodiment of the inventive concept. In FIG. 7, at block 705, boot request processor 330 of FIG. 3 may receive/intercept block boot request 605 of FIG. 6 as received by host interface layer 305 of FIG. 3 of KV-SSD 125 of FIG. 1. At this point, there are two alternative approaches. In one approach, at block 710, boot request processor 330 of FIG. 3 may access the boot data directly from the appropriate address (for example, hardware address 0) of KV-SSD 125 of FIG. 1. Alternatively, at block 715, boot request processor 330 of FIG. 3 may replace block-based boot request 605 of FIG. 6 with KV boot request 610 of FIG. 6, which may include boot key 505 of FIG. 6, and at block 720 KV-SSD 125 of FIG. 1 may retrieve the boot data as though it were requested via a conventional KV request. Either way, at block 725 boot request processor 330 of FIG. 3 may return the boot data to the BIOS of machine 105 of FIG. 1.

Figure 8:
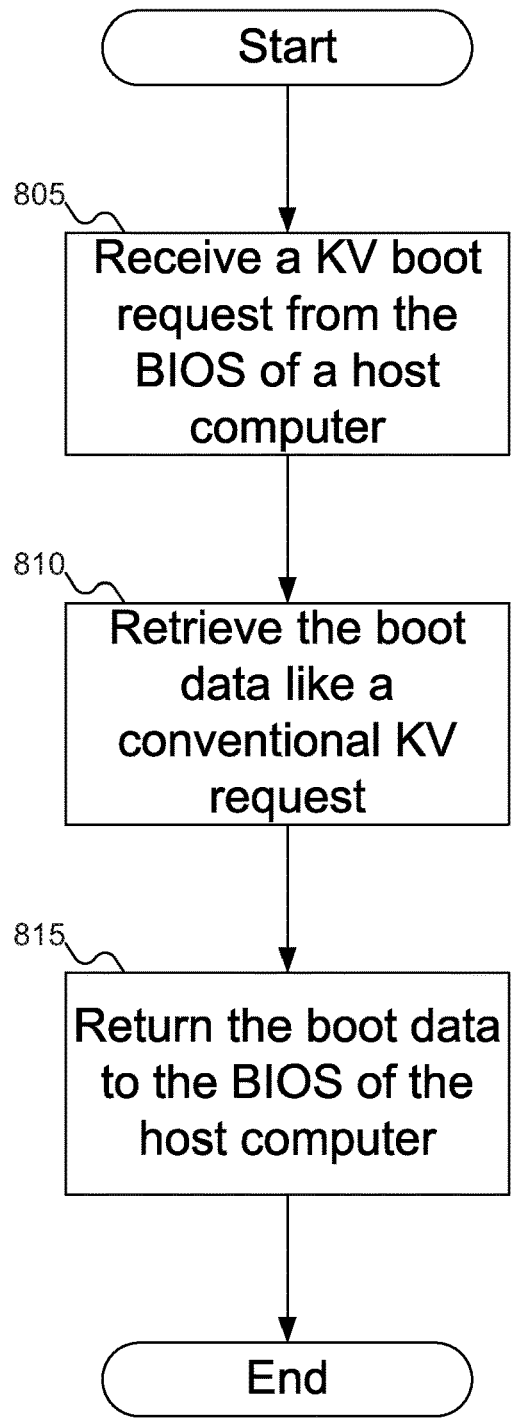
FIG. 8 shows a flowchart of an example procedure for the KV-SSD of FIG. 1 to process a KV boot request, according to an embodiment of the inventive concept.

FIG. 8 shows a flowchart of an example procedure for KV-SSD 125 of FIG. 1 to process a KV boot request, according to an embodiment of the inventive concept. In the embodiments of the inventive concept covered by FIG. 8, the BIOS of machine 105 of FIG. 1 may issue a KV request to retrieve the boot data from KV-SSD 125 of FIG. 1. In FIG. 8, at block 805, host interface layer 305 of FIG. 3 may receive a KV boot request from the BIOS of machine 105 of FIG. 1. At block 810, SSD controller 310 of FIG. 3 may retrieve the boot data in response to the KV boot request. Finally, at block 815, KV-SSD 125 of FIG. 1 may return the boot data to the BIOS of machine 105 of FIG. 1.

In FIGS. 7-8, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. A KV device (which may be a KV-SSD or any other KV device), KV device 125 of FIG. 1 may receive a boot request, process it, and return the boot data to the BIOS of machine 105. Note that KV device 125 of FIG. 1 may process a boot request without the BIOS of machine 105 of FIG. 1 having to be updated to be able to send a KV boot request (which update may not be possible, depending on the specific age and configuration of machine 105 of FIG. 1). KV device 125 of FIG. 1 may even handle a block-based boot request from the BIOS of machine 105, even though KV device 125 of FIG. 1 does not normally handle block-based requests.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Key-Value (KV) storage device, comprising:
storage for objects, where each object includes data associated with a key;
a host interface layer to receive requests from a host computer and to return results of the requests, the requests including a read request to get a first data associated with a first key from the storage for objects, a write request to put a second data associated with a second key in the storage for objects, and a boot request to get boot data from the storage for objects; and
a boot request processor to process the boot request using the storage for objects.

Statement 2. An embodiment of the inventive concept includes the KV storage device according to statement 1, wherein the KV storage device includes a KV Solid State Drive (KV-SSD).

Statement 3. An embodiment of the inventive concept includes the KV storage device according to statement 2, wherein the boot data includes one of a Master Boot Record (MBR) or a Globally Unique Identifier (GUID) Partition Table.

Statement 4. An embodiment of the inventive concept includes the KV storage device according to statement 2, wherein:
the storage for objects includes the boot data stored at a logical block address (LBA) of 0; and
the boot request includes a block boot request to get the boot data from the LBA of 0.

Statement 5. An embodiment of the inventive concept includes the KV storage device according to statement 2, wherein the storage for objects includes a boot object storing the boot data associated with a boot key.

Statement 6. An embodiment of the inventive concept includes the KV storage device according to statement 5, wherein the boot request includes a boot get request including the boot key.

Statement 7. An embodiment of the inventive concept includes the KV storage device according to statement 5, wherein:
the boot request includes a block boot request to get the boot data from the LBA of 0; and
the boot request processor is operative to replace the block boot request with a boot get request including the boot key.

Statement 8. An embodiment of the inventive concept includes the KV storage device according to statement 2, wherein the host interface layer is returns the boot data to the host computer based at least in part on the boot request processor returning the boot data in response to the boot request.

Statement 9. An embodiment of the inventive concept includes the KV storage device according to statement 8, wherein:
the host computer includes a Basic Input/Output System (BIOS), the BIOS sending the boot request; and
the host interface layer returns the boot data to the BIOS.

Statement 10. An embodiment of the inventive concept includes a method, comprising:
receiving a boot request from a host computer at a Key-Value (KV) storage device;
retrieving a boot data from the KV storage device based at least in part on the boot request; and
returning the boot data from the KV storage device to the host computer.

Statement 11. An embodiment of the inventive concept includes the method according to statement 10, wherein the boot data includes one of a Master Boot Record (MBR) or a Globally Unique Identifier (GUID) Partition Table.

Statement 12. An embodiment of the inventive concept includes the method according to statement 10, wherein:
receiving a boot request from a host computer at a Key-Value (KV) storage device includes receiving the boot request from the host computer at a KV Solid State Drive (KV-SSD);
retrieving a boot data from the KV storage device based at least in part on the boot request includes retrieving the boot data from the KV-SSD based at least in part on the boot request; and returning the boot data from the KV storage device to the host computer includes returning the boot data from the KV-SSD to the host computer.

Statement 13. An embodiment of the inventive concept includes the method according to statement 12, wherein:

receiving the boot request from the host computer at a KV Solid State Drive (KV-SSD) includes receiving the boot request from a Basic Input/Output System (BIOS) of the host computer at the KV-SSD; and returning the boot data from the KV-SSD to the host computer includes returning the boot data from the KV-SSD to the BIOS of the host computer.

Statement 14. An embodiment of the inventive concept includes the method according to statement 12, wherein receiving the boot request from the host computer at a KV Solid State Drive (KV-SSD) includes receiving a block boot request to get the boot data from a Logical Block Address (LBA) of 0.

Statement 15. An embodiment of the inventive concept includes the method according to statement 14, wherein retrieving the boot data from the KV-SSD based at least in part on the boot request includes retrieving the boot data from the LBA of 0 on the KV-SSD.

Statement 16. An embodiment of the inventive concept includes the method according to statement 14, wherein retrieving the boot data from the KV-SSD based at least in part on the boot request includes:

converting the block boot request into a KV boot request to retrieve the boot data associated with a boot key; and performing the KV boot request with the boot key.

Statement 17. An embodiment of the inventive concept includes the method according to statement 12, wherein:

receiving the boot request from the host computer at a KV Solid State Drive (KV-SSD) includes receiving a KV boot request with a boot key from the host computer at the KV-SSD; and retrieving the boot data from the KV-SSD based at least in part on the boot request includes performing the KV boot request with the boot key.

Statement 18. An embodiment of the inventive concept includes an article, comprising a non-transitory storage medium, the non-transitory storage medium having stored thereon instructions that, when executed by a machine, result in:

receiving a boot request from a host computer at a Key-Value (KV) storage device;

retrieving a boot data from the KV storage device based at least in part on the boot request; and returning the boot data from the KV storage device to the host computer.

Statement 19. An embodiment of the inventive concept includes the article according to statement 18, wherein the boot data includes one of a Master Boot Record (MBR) or a Globally Unique Identifier (GUID) Partition Table.

Statement 20. An embodiment of the inventive concept includes the article according to statement 18, wherein:

receiving a boot request from a host computer at a Key-Value (KV) storage device includes receiving the boot request from the host computer at a KV Solid State Drive (KV-SSD);

retrieving a boot data from the KV storage device based at least in part on the boot request includes retrieving the boot data from the KV-SSD based at least in part on the boot request; and returning the boot data from the KV storage device to the host computer includes returning the boot data from the KV-SSD to the host computer.

Statement 21. An embodiment of the inventive concept includes the article according to statement 20, wherein:

receiving the boot request from the host computer at a KV Solid State Drive (KV-SSD) includes receiving the boot request from a Basic Input/Output System (BIOS) of the host computer at the KV-SSD; and returning the boot data from the KV-SSD to the host computer includes returning the boot data from the KV-SSD to the BIOS of the host computer.

Statement 22. An embodiment of the inventive concept includes the article according to statement 20, wherein receiving the boot request from the host computer at a KV Solid State Drive (KV-SSD) includes receiving a block boot request to get the boot data from a Logical Block Address (LBA) of 0.

Statement 23. An embodiment of the inventive concept includes the article according to statement 22, wherein retrieving the boot data from the KV-SSD based at least in part on the boot request includes retrieving the boot data from the LBA of 0 on the KV-SSD.

Statement 24. An embodiment of the inventive concept includes the article according to statement 22, wherein retrieving the boot data from the KV-SSD based at least in part on the boot request includes:

converting the block boot request into a KV boot request to retrieve the boot data associated with a boot key; and performing the KV boot request with the boot key.

Statement 25. An embodiment of the inventive concept includes the article according to statement 20, wherein:

receiving the boot request from the host computer at a KV Solid State Drive (KV-SSD) includes receiving a KV boot request with a boot key from the host computer at the KV-SSD; and retrieving the boot data from the KV-SSD based at least in part on the boot request includes performing the KV boot request with the boot key.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A Key-Value Solid State Drive (KV-SSD), comprising:
   storage for objects, where each object includes data associated with a key;
   a host interface layer to receive requests from a host computer and to return results of the requests, the requests including a read request to get a first data associated with a first key from the storage for objects, a write request to put a second data associated with a second key in the storage for objects, and a boot request to get boot data from the storage for objects, the boot request to load an operating system on the host computer; and
   a boot request processor to process the boot request using the storage for objects.

2. The KV-SSD according to claim 1, wherein the boot data includes one of a Master Boot Record (MBR) or a Globally Unique Identifier (GUID) Partition Table.

3. The KV-SSD according to claim 1, wherein:
   the storage for objects includes the boot data stored at a logical block address (LBA) of 0; and
   the boot request includes a block boot request to get the boot data from the LBA of 0.

4. The KV-SSD according to claim 1, wherein the storage for objects includes a boot object storing the boot data associated with a boot key.

5. The KV-SSD according to claim 4, wherein the boot request includes a boot get request including the boot key.

6. The KV-SSD according to claim 4, wherein:
the boot request includes a block boot request to get the boot data from the LBA of 0; and
the boot request processor is operative to replace the block boot request with a boot get request including the boot key.

7. The KV-SSD according to claim 1, wherein the host interface layer returns the boot data to the host computer based at least in part on the boot request processor returning the boot data in response to the boot request.

8. The KV-SSD according to claim 7, wherein:
the host computer includes a Basic Input/Output System (BIOS), the BIOS sending the boot request; and
the host interface layer returns the boot data to the BIOS.

9. A method, comprising:
receiving a boot request from a host computer at a host interface layer of a Key-Value Solid State Drive (KV-SSD), the boot request to load an operating system on the host computer;
retrieving a boot data from the KV-SSD based at least in part on the boot request; and
returning the boot data from the KV-SSD to the host computer,
wherein the host interface layer is configured to also receive a read request to get a first data associated with a first key from a storage for objects of the KV-SSD and a write request to put a second data associated with a second key in the storage for objects of the KV-SSD.

10. The method according to claim 9, wherein the boot data includes one of a Master Boot Record (MBR) or a Globally Unique Identifier (GUID) Partition Table.

11. The method according to claim 10, wherein:
receiving the boot request from the host computer at a KV-SSD includes receiving the boot request from a Basic Input/Output System (BIOS) of the host computer at the KV-SSD; and
returning the boot data from the KV-SSD to the host computer includes returning the boot data from the KV-SSD to the BIOS of the host computer.

12. The method according to claim 10, wherein receiving the boot request from the host computer at a KV Solid State Drive (KV-SSD) includes receiving a block boot request to get the boot data from a Logical Block Address (LBA) of 0.

13. The method according to claim 12, wherein retrieving the boot data from the KV-SSD based at least in part on the boot request includes retrieving the boot data from the LBA of 0 on the KV-SSD.

14. The method according to claim 12, wherein retrieving the boot data from the KV-SSD based at least in part on the boot request includes:
converting the block boot request into a KV boot request to retrieve the boot data associated with a boot key; and
performing the KV boot request with the boot key.

15. The method according to claim 10, wherein:
receiving the boot request from the host computer at a KV Solid State Drive (KV-SSD) includes receiving a KV boot request with a boot key from the host computer at the KV-SSD; and
retrieving the boot data from the KV-SSD based at least in part on the boot request includes performing the KV boot request with the boot key.

16. An article, comprising a non-transitory storage medium, the non-transitory storage medium having stored thereon instructions that, when executed by a machine, result in:
receiving a boot request from a host computer at a host interface layer of a Key-Value Solid State Drive (KV-SSD), the boot request to load an operating system on the host computer;
retrieving a boot data from the KV-SSD based at least in part on the boot request; and
returning the boot data from the KV-SSD to the host computer
wherein the host interface layer is configured to also receive a read request to get a first data associated with a first key from a storage for objects of the KV-SSD and a write request to put a second data associated with a second key in the storage for objects of the KV-SSD.

17. The article according to claim 16, wherein receiving the boot request from the host computer at a KV-SSD includes receiving a block boot request to get the boot data from a Logical Block Address (LBA) of 0.

* * * * *